United States Patent [19]
Teel, Sr.

[11] Patent Number: 5,522,610
[45] Date of Patent: Jun. 4, 1996

[54] BICYCLE ADAPTED FOR TANDEM USE

[76] Inventor: Willis A. Teel, Sr., 1804 Cambay Ct., Opelika, Ala. 36801

[21] Appl. No.: 317,567

[22] Filed: Oct. 4, 1994

[51] Int. Cl.$^6$ .................................................. B62K 13/02
[52] U.S. Cl. .......................................... 280/239; 280/276
[58] Field of Search ...................... 280/239, 231, 280/230, 274, 275, 276, 277, 279

[56] References Cited

U.S. PATENT DOCUMENTS

| | | | |
|---|---|---|---|
| 305,690 | 9/1884 | Humber | 280/239 |
| 1,300,343 | 4/1919 | Carswell | 280/239 |
| 4,458,908 | 7/1984 | Strong | 280/239 |
| 5,039,120 | 8/1991 | Stowe | 280/204 |
| 5,076,600 | 12/1991 | Fake | 280/304.3 X |
| 5,372,371 | 12/1994 | Larson | 280/239 X |

FOREIGN PATENT DOCUMENTS

| | | | |
|---|---|---|---|
| 1077941 | 11/1954 | France | 280/239 |
| 3729879 | 3/1989 | Germany | 280/239 |
| 244364 | 1/1926 | Italy | 280/276 |

*Primary Examiner*—Kevin T. Hurley
*Attorney, Agent, or Firm*—Browdy and Neimark

[57] ABSTRACT

Bicycles are adapted to be combined by removing the front wheel of a trailing one of the bicycles and attaching the front fork ends to the rear axle of a leading one of the bicycles, resulting in a three-wheeled tandem bicycle with two drive wheels. To allow for relative pitching motion of the coupled bicycles, the attachment includes bearings. Each bearing may include a brass sleeve over the rear axle and a separable end cap on each fork end, the cap held to the fork by screws. The sleeve is longer than the width of the fork end to prevent binding. Each fork includes a yaw-correction torsion spring that resists angular rotation of the handlebars of the trailing bicycle relative to the rear axle of the leading bicycle. The yaw-correction spring may include a flat tine portion of the fork. The tine preferably slides into the upper part of the fork in a slot. Coil springs may also be provided between the upper and lower parts of each fork to resist road shock and to further control relative movements of the bicycles.

17 Claims, 2 Drawing Sheets

BICYCLE ADAPTED FOR TANDEM USE

FIELD OF THE INVENTION

The present invention relates to tandem bicycles. More particularly, it relates to attachment of a leading bicycle to a trailing bicycle, where the leading and trailing bicycles are hingedly joined, and the whole arrangement rests on three tandem wheels.

BACKGROUND OF THE INVENTION

At present there is a need for an inexpensive tandem bicycle, which is not being met by the very expensive rigid-frame tandems available in bicycle shops. The rigid-frame tandems are not only expensive, but are also inefficient when only one person wishes to ride the tandem because of the extra length and weight and the decreased maneuverability.

Several prior-art devices have joined a leading bicycle to a trailing bicycle whose front wheel has been removed in order to form a tandem with three wheels. Thus, U.S. Pat. No. 1,300,343, issued to J. A. Carswell, shows a trailing bicycle connected to a leading bicycle by coupling links 10, made in mirror image, which bolt onto the frame of a leading bicycle and include offset hubs 16 with bearings, to which the front forks of a trailing bicycle are fastened. The Carswell device requires two expensive, complex-shaped pieces and bearings.

German patent DE 37 29 879, to König, depicts two bicycles connected by attaching the front forks of a trailing bicycle to either the frame or the axle of the leading bicycle. The König patent is believed to be the basis of the "Cyclemate" device advertised in the August 1994 issue of Popular Science magazine.

John Strong, in U.S. Pat. No. 4,458,908, shows a tandem bicycle much like that of Carswell or König except that a complicated mechanism is deployed between the frame and the forks of the trailing bicycle. Strong explains at col. 4, line 17 that his device allows the trailing "section" (bicycle) "to tilt, to bend, and to articulate independently from a leading section" which in Strong's parlance means that the trailing bicycle may roll, pitch, and yaw relative to the leading bicycle. At col. 8, line 5, he adds, "The invention resides in . . . allowing independent tilting [rolling], articulating [yawing], and, in the preferred embodiment, bending [pitching] . . . In its most general terms, the invention resides in . . . provision of means to accommodate the tilting [rolling]."

Strong's forks are rigidly attached to one another. All hinging is within the headset. In FIG. 3, it is seen that Strong's front forks 70 are not separated sufficiently to allow fastening directly to the axle 62.

None of the above-listed patents discloses mounting a trailing bicycle to a leading bicycle without the provision of special hardware, such as the brackets of Carswell.

The prior art does not show a single bicycle that is adapted to be interchangeably used as a trailing or a leading bicycle when combined with another identical bicycle nor any bicycle that, when combined with other identical bicycles, is able to form a chain of more than two bicycles.

The prior art does not disclose any front fork having springs to resist yawing of a front fork wheel axis, nor such springs combined with fork compression springs.

The prior art does not disclose or suggest a bicycle that is only slightly more expensive than a regular bicycle, but is also easily adapted to tandem as well as to solo use.

SUMMARY OF THE INVENTION

Accordingly, the present invention has for an object, among others, to overcome deficiencies in the prior art, such as that noted above.

The invention thus relates to a bicycle which is adapted, by modification of the front forks (and optionally of the rear axle) to be connected with another identical or similar bicycle, in a tandem configuration of three wheels. The tandem arrangement of two connected bicycles is achieved by removing the front wheel of the trailing bicycle and connecting its front forks onto the rear axle of the leading bicycle. The connection includes a bearing allowing the forks to rotate about the rear axle, so that the three-wheeled combination may traverse non-flat surfaces without one of the three wheels losing contact with the ground. If desired, more than two of the bicycle may be attached together to form a chain of bicycles.

The present invention contemplates that the front forks may be attached to the rear axle by various adaptations. One such adaptation is to make the front forks, at their ends, wide enough to fit over the rear frame stays; another is to include a removable, bolt-on end cap to clamp selectively either the front or the rear axle against the end of the front fork (similar bolt-on end caps are used on motorcycle front forks). The rear axle may be made extra long, if needed, to provide a region of the axle shaft over which the front fork may be clamped.

The invention also contemplates that the front forks may be adapted to the special dynamics of tandem use, by including resilient springs to resist yawing of the front axis defined by the ends of the forks. In particular, each of the front forks may include an axially-deployed torsion spring that resists twisting of that fork about a longitudinal axis.

In addition to the anti-twist spring, each front fork may also include a compression spring to absorb road shock and to resist differential extension or compression of the two forks.

DETAILED DESCRIPTION OF THE PREFERRED EMBODIMENT

In the following Specification and Claims:

"axle" means a member, whether integral or a composite built up of sub-members, which extends at least partially through a hub of a wheel, and typically supports bearings for wheel rotation;

"fork" means either of the two front members which extend from the headset to adjacent the axle of the front wheel when the front wheel is mounted onto a two-wheeled bicycle;

"fork assembly" means the assembly that pivots about the axis of the headset bearings when the handlebars are moved, and the forks are disconnected from any resisting force or object;

"headset" means a rigid portion of a fork assembly that pivots as a unit in the headset bearings.

The present invention relates to a bicycle which is adapted to both solo, two-wheeled use by a single rider, as well as tandem, three-wheeled use by two riders. It is also adaptable to use by more than three riders, in bicycle trains.

Figure 1:
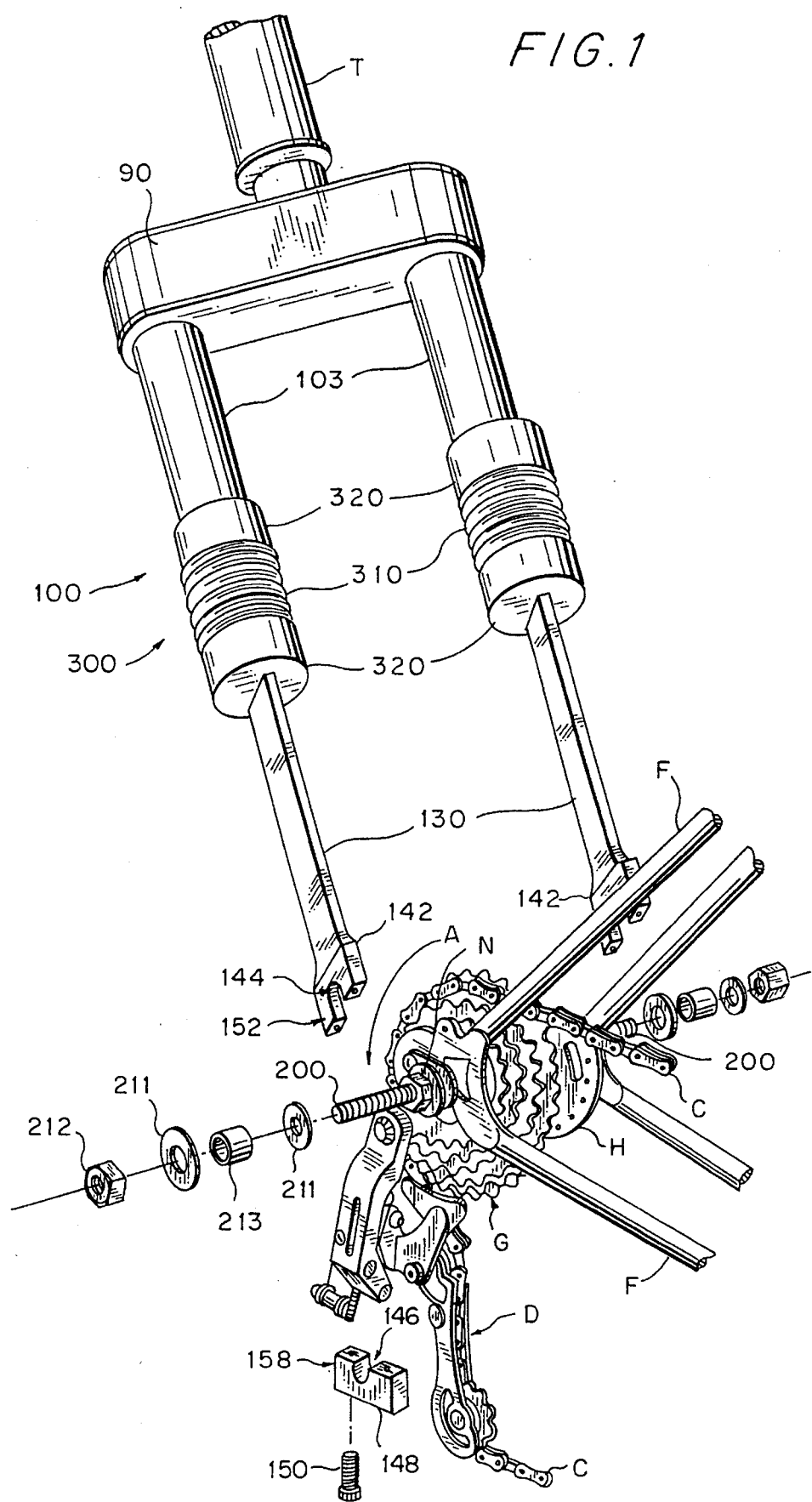
FIG. 1 is an environmental, partially exploded perspective view of one embodiment of the invention.

In the present invention the front forks of a first or trailing bicycle may be coupled to the rear axle of a second or leading bicycle, as is seen in overview in FIG. 1. Portions of the leading bicycle shown in FIG. 1 include a portion of the frame F, the hub H, gear cluster G, derailleur D and chain C. The rear wheel of the leading bicycle is omitted for clarity. The trailing bicycle frame and wheels are not shown, but the trailing bicycle may be similar to the leading bicycle. Those parts not shown in the drawing are conventional.

In FIG. 1 a steering head frame tube T is part of a bicycle frame of the trailing bicycle. The head tube T contains inside it a conventional headset shaft and bearings (not shown) which allow the fork assembly, comprising the headset and the forks 100, to rotate for steering the bicycle. Conventional handlebars (not shown) are clamped to the headset shaft so that the rider may turn the forks about the pivot axis of the headset bearings. The left and right forks 100 are identical or else mirrors image in shape, as is conventional. Left and right-hand parts are labelled by the same number in the drawing figures.

The left and right forks 100 are shown as separate members welded to a fork cap 90, which is part of the headset. The forks 100 may also be formed as the two ends of a single bent pipe (not shown) or otherwise joined in any conventional manner to the headset. The forks 100 extend downwardly, generally parallel to one another and to the tube T and the headset bearings axis. At the end of each fork 100 is an axle clamp, shown in exploded view in FIG. 1. The clamp includes a fork end 142 having a semi-circular indent 144 and an end cap 148 having a mating semi-circular indent 146. The indents 144 and 146 together fasten about the axle extension 200 of a rear axle A (shown exploded out of the indents in FIG. 1). The fastening is accomplished by bolts 150 (two bolts per fork) which screw into threaded holes 152 in fork end 142 through passages 158 in end cap 148.

The axle extension 200 is preferably an integral portion of the axle A, which is conventional except for the extension 200, which merely adds length. (The conventional bicycle axle is a steel rod, about 5/16 inches in diameter and 5 inches long, threaded at both ends.) If the present invention is adapted to an existing bicycle, and the axle A is sufficiently long, or otherwise formed so that the front fork of the bicycle may be attached to the axle by conventional means, then no adaptation in the form of an axle extension 200 is required. The present invention is not restricted to any particular coupling. Typically, the rear axle A is made just long enough that a nut (N in FIG. 1) can be threaded onto the axle end when the axle and hub are placed into the rear frame slots conventionally provided; in the present invention, the rear axle A should be longer than this by about one inch (one half inch on each side).

Figure 2:
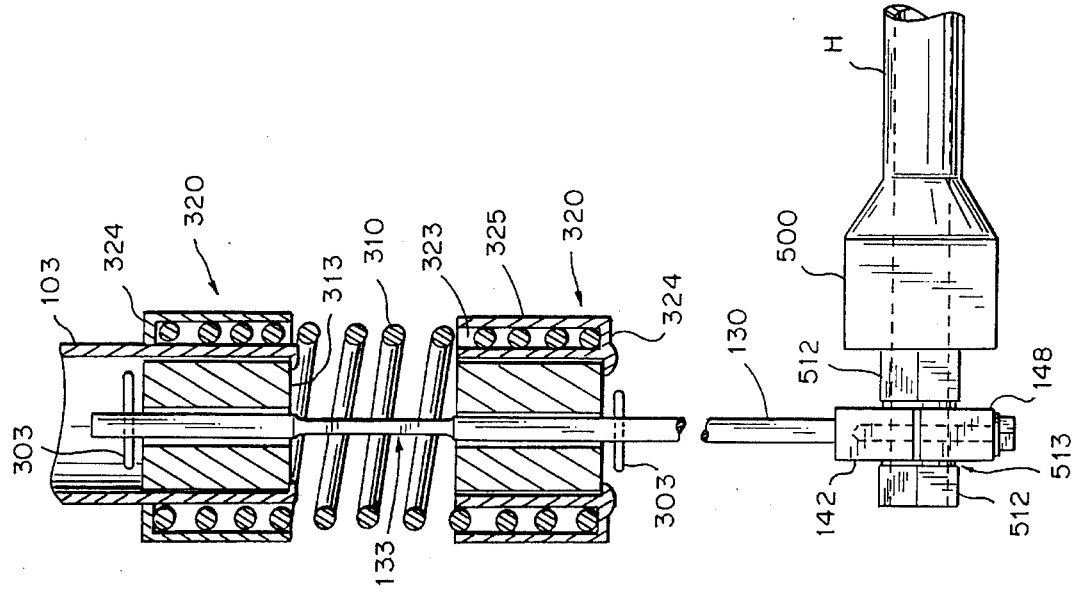
FIG. 2 is a cross sectional view of a front fork according to the invention.

Bicycle rear axles are often made wider than front axles, because of the drive chain and gear-changing mechanism next to the hub. In the present invention the forks 100 are wider than is conventional, so that they may span the rear axle. In order that the front axle may be spanned by the front forks, the front axle may also be made wider than usual. (A wide front axle with extensions 500 is shown in FIG. 2.)

The indents 144, 146 do not clamp tightly against the axle A, since the forks 100 should be free to pitch relative to the frame F of the leading bicycle; If the forks 100 were clamped tightly to the rear axle A, which in turn is clamped tightly onto the frame F by the nuts N, then it would be difficult for the three-wheeled tandem to negotiate hilltops and other curved road surfaces without strain, instability, loosening of the nut N or loss of traction.

To allow the forks 100 to partially rotate or hinge about the axle A, the present invention employs on either side a collar tube 213 and two washers 211, all preferably made of brass or lined with bearing material, for good bearing qualities, with the steel indents of the fork end 142 and end cap 148. The collar tube 213 has an inner diameter just larger than the outer diameter of the threads of the axle extension 200, so that it may slide over the threads but be retained without wobble. Its outer diameter is slightly smaller than the diameter of the aperture formed by the end indents 144, 146 when the end cap 148 is bolted to the fork 100 with the bolts 150. The brass washers 211 have inside diameters like that of the collar tube 213, but their outer diameters are larger.

When the two washers 211 and the collar tube 213 are assembled onto the axle extension 200, a nut 212, which threads onto the shaft of the axle extension 200, may be tightened onto the outer one of the two washers 211 to clamp the whole assembly together. The length of the collar tube 213 is slightly greater than the thickness of the fork end 142. Because of the dimensions of the collar tube 213, it and the two washers 211 form a brass bearing surface for the fork end, which is held in position on the axle A but is not clamped against rotation. This allows the trailing bicycle to pitch, but not to yaw or roll.

The bearing surface may alternatively be formed by other structures which perform the same function. For example, the two washers and the collar tube may be replaced by a single flanged collar tube and one washer, or by a ball bearing held in the end of either fork 100, and so on. Also, in an alternate embodiment the forks 100 may end in tangs having through-holes (not shown) that are not separable; such fork ends may be drawn apart by bending each fork 100 slightly outward to clear the ends of the axle A, and then letting the tangs snap back over the axle extensions 200, after which one of each pair of washers 211 and the respective nut 212 are onto the axle extensions 200. The forks 100 of the present invention are more resilient than conventional forks, as is explained in more detail below.

Each fork 100 includes a yaw correction and shock mechanism 300 which resiliently joins the fork end to the rigid pipe 103. The mechanism includes a tine 130 which is about 6 inches long, 1 inch wide, and 3/16 inch thick. The tine 130 is preferably made of steel which can be tempered to act as a spring. At its lower end it terminates in the fork end 142; its upper end is resiliently and slidably joined to the pipe 103 by the mechanism. The mechanism also includes two cylindrical sections 320 and a coil spring 310.

FIG. 2 shows the yaw correction and shock mechanism 300 in greater detail. FIG. 2 is a cross-sectional view on a plane perpendicular to the plane of the tine 130.

As seen in FIG. 2, the pipe 103 is coupled to the tine 130 both by the coil spring 310 and by a sliding engagement of the tine 130 in slots, which slots are defined by openings between plus inserts 313 in both the upper and lower cylindrical sections 320. The inserts 313 are welded or otherwise strongly fixed in place. FIG. 2 shows the slots in transverse view. The sliding allows the two cylindrical sections 320 to be compressed together, as by road shock, without compressing the tine itself.

To hold the tine 130 within the slots, tine pins 303 are press-fitted through holes in the tine 130. The pins 303 prevent separation of the upper and lower sections 320 beyond the separation shown in FIG. 2.

The upper cylindrical section 320 and the lower cylindrical section 320 are identical parts, further composed of an inner tube section 323 and an outer section 325. In the upper section 320 the inner tube 323 may be an extension of the pipe 103 of the upper fork; the inner tube in the lower section 320 may be similar. The inner tube 323 and the outer tube 323 of each section are joined by a washer-like piece 324 to form a double-walled space. The coil spring 310 is disposed partially within each space. All these parts are welded together so that the sections 320 are rigid. The ends of the coil spring 310 are fixed, but the coil spring 310 is not held against either the inner tube 323 or the outer tube 325.

The shock-absorbing part of the yaw correction and shock mechanism 300 inheres solely in the coil spring 310. The yaw portion of the mechanism inheres only partially in the coil spring, which resists twisting of the tine relative to the pipe 103, as well as longitudinal compression along the length of the fork 100, because its ends are welded. However, the greater part of the resistance to twisting is provided by the tine 130.

Figure 3:
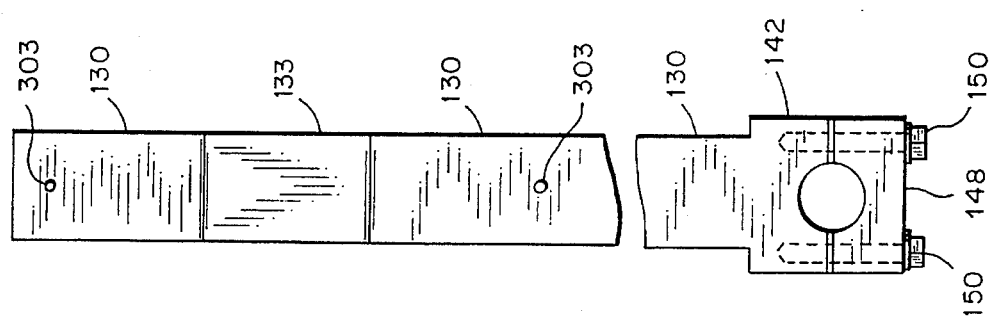
FIG. 3 is an elevational view of a tine.

As seen in FIG. 2 and also in FIG. 3, the tine 130 includes a thinner portion 133, which is disposed generally between the slots of the upper and lower cylindrical sections 320. This portion 133 has a lower torsional spring constant than does the rest of the tine 130, which allows the two sections 320 to relatively twist while retaining sufficient stiffness in the remainder of the tine 130. The section 133 may be tempered differently from the remainder of the tine 130.

The tine 130 may alternatively be uniform in cross-section.

In FIG. 2 the fork 100 is shown mounted to a front wheel, rather than to a rear wheel as in FIG. 1. So that a standard front wheel might be used with the widened front forks 100, a spacer 500 is inserted between the front-wheel hub H and the first nut 512 threaded onto the front axle on either side; these take up the extra length of the front axle. If the front axle is the same diameter as the rear, then collar 513 is inserted in between the indents 144, 146 of the tine 130 to keep the indents and axle concentric. The collar tube 513 is similar to the collar tube 213 of FIG. 1 except that its length is slightly less than the thickness of the fork end 142, instead of slightly longer. The front-wheel collar tube is shorter because the fork 100 may be rigidly clamped onto the front wheel axle, and indeed should be tightly clamped on. For the same reason, the brass washers 211 that are used when attaching the front forks 100 to the rear axle are not needed.

Figure 4:
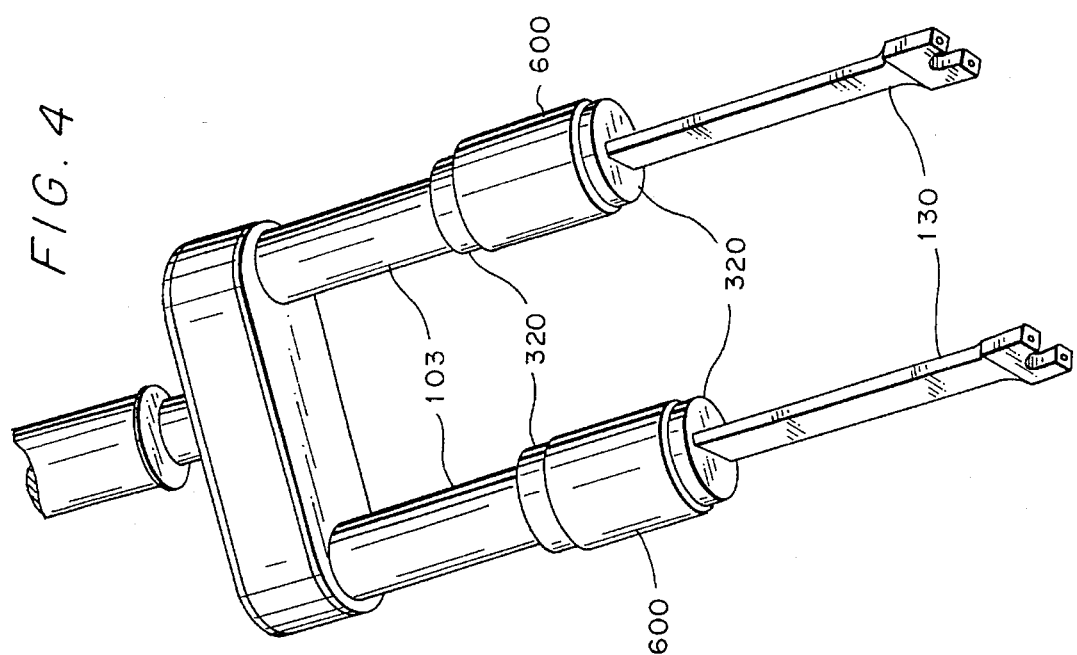
FIG. 4 is a perspective view of forks with clamps.

The spring constants of the tine section 133 and the coil spring 310 are chosen to be stiff enough that the front forks 100 may be used in the regular two-wheel bicycle configuration without instability. If more stiffness is desired for two-wheel riding, removable clamps 600 (shown in FIG. 4) may be used to prevent relative movements of the two sections 320 of the yaw correction and shock mechanism 300 on each fork 100.

Yaw correction is achieved with the present invention by allowing roll in a vertical plane that includes the plane of the forks. A counter moment is produced by the compression of the springs 310 and the bending of the spring steel sections 133 of the tines 130. The forks 100 are allowed to rotate through a small arc in a plane perpendicular to the length of either fork 100; counter torque is provided by the twisting of the tines 130 and the coil springs 310.

Rotation of the rear axle within a horizontal plane produces a torque if the forks 100 are held in place by the rider of the trailing bicycle, who can hold the handlebars (not shown) attached to the forks 100 through the steering headset. The rider of the trailing bicycle can remove this torque by rotating the handle bars through the same angle of rotation. If the trailing bicycle has no rider, the handlebars and forks 100 will track automatically and the leaning of the leading bicycle when cornering will be transferred to the trailing bicycle.

The rotation of the rear axle of the leading bicycle can be considered as an infinite number of small arcs. With each increment of arc, the rider of the trailing bicycle can feel the torque and rotate his handlebars in concert with these incremental motions. Leaning in the direction of the turn by the trailing rider will then result in a smooth and stable turn.

Should the rider of the trailing bicycle turn his handlebars independently, out of concert with the leading rider, then the flexing of the springs 310 and the tines 130 and the resulting counter torque would signal to him to let up. The counter torque prevents hard coupling and the resultant instability that would be characteristic of rigid forks of the standard bicycle.

The present invention does not require any modification to the frame of a bicycle, and so can be put into production without expensive retooling. Moreover, the preferred front fork of the invention is simple and easily fabricated. It can be made for about ten dollars more than a conventional set of forks, and marketed for about twenty dollars more. (The usual cost of spring-supported front forks, without yaw correction, is about ten dollars extra).

To lower the cost of the present invention to the consumer, the invention can be used with one bicycle having modified forks and one having standard forks; this would roughly halve the additional added cost for a pair of bicycles that would usable as a tandem pair, since the extra cost of an extended axle bolt is very small.

The present invention is much cheaper and easier to store than a standard tandem with one frame and two wheels, and it has an extra wheel for better traction and less wheel loading.

The foregoing description of the specific embodiments will so fully reveal the general nature of the invention that others can, by applying current knowledge, readily modify and/or adapt for various applications such specific embodiments, without departing from the generic concepts, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a bicycle of the type including a frame, a headset pivotally connected to the frame, front forks mounted on the headset, a front axle removably mounted on either side to the forks, a front wheel rotatably mounted for rotation on the front axle, a rear axle removably mounted on either side to the frame, and a rear wheel mounted on the rear axle, the improvement comprising:

an adaptation for multiply-connected tandem usage of a plurality of bicycles, the bicycles including a trailing bicycle and a leading bicycle, the adaption for the bicycle to act as the trailing bicycle comprising:

rear-axle shaft extensions extending outwardly beyond rear axle mounting areas of the frame, the shaft extensions being a distance apart;

a separation between the front forks equal to or greater than the distance, whereby the front forks may be mounted on the shaft extensions of the rear axle;

pitch-motion bearings disposable at respective ends of the front forks, the pitch-motion bearings adapted to coupling the forks onto the shaft extensions; and apertures adapted to receiving and holding the pitch-motion bearings at the respective ends of the front forks;

wherein the pitch-motion bearings further comprise:

generally cylindrical inner surfaces of the apertures;

sleeves insertable within the apertures, the sleeves including central bores sized to accept therewithin the shaft extensions and having a sleeve length greater than a thickness of the front forks at the apertures; and bearing lock nuts threadable onto the shaft extensions to prevent the sleeves from falling from the shaft extensions;

whereby the inner surfaces may rotate about the shaft extensions.

2. The adaptation according to claim 1, wherein the sleeves are brass, and further including brass washers disposed at ends of the sleeves.

3. The adaptation according to claim 1, wherein the apertures are disposed between the ends of the front forks and removable end caps, such that the end caps may be removed for releasing the shaft extensions from the front forks.

4. The adaptation according to claim 3, wherein the end caps are removably fastened onto the front forks with screws.

5. In a bicycle of the type including a frame, a headset pivotally connected to the frame, front forks mounted on the headset, a front axle removably mounted on either side to the forks, a front wheel rotatably mounted for rotation on the front axle, a rear axle removably mounted on either side to the frame, and a rear wheel mounted on the rear axle, the improvement comprising:

an adaptation for multiply-connected tandem usage of a plurality of bicycles, the bicycles including a trailing bicycle and a leading bicycle, the adaption for the bicycle to act as the trailing bicycle comprising:

rear-axle shaft extensions extending outwardly beyond rear axle mounting areas of the frame, the shaft extensions being a distance apart;

a separation between the front forks equal to or greater than the distance, whereby the front forks may be mounted on the shaft extensions of the rear axle; and pitch-motion bearings disposable at respective ends of the front forks, the pitch-motion bearings adapted to coupling the forks onto the shaft extensions;

wherein each of the front forks includes yaw-resisting means for torsional springing, disposed between an upper part of the fork and a lower end of the fork distal the upper part, to resiliently resist angular deviation between the headset and the lower end.

6. The adaptation according to claim 5, wherein the yaw-resisting means further comprises a flat tine portion of the fork, the portion including a length of resilient material.

7. The adaptation according to claim 5, wherein each of the front forks further includes compression-resisting means to resiliently resist longitudinal compression of the fork.

8. The adaptation according to claim 7, wherein the compression-resisting means includes a coil spring disposed between an upper part of the fork and a lower part of the fork.

9. The adaptation according to claim 8, wherein the fork includes telescoping slide means for maintaining a linear alignment of the upper part and the lower part during compression of the fork.

10. The adaptation according to claim 9, further comprising removable clamps to render the fork rigid.

11. The adaptation according to claim 9, wherein the telescoping slide means further comprises a yaw-resisting flat tine portion of the fork slidably disposed within an upper slot of the upper part and a lower slot of the lower part.

12. A front fork assembly of a trailing bicycle for allowing the trailing bicycle to be coupled to a leading bicycle, the trailing bicycle having handlebars and a headset pivot, the fork assembly adapted to mechanically couple the handlebars through a headset to two points of the leading bicycle, each of the points adjacent a rear wheel axis of the leading bicycle; the fork assembly comprising:

respective pitch-motion bearings for coupling the fork assembly to the points;

two elongate forks each mechanically coupling a respective one of the pitch-motion bearings to the headset; and yaw-resisting torsion spring means for torsional springing between the headset and the pitch-motion bearings and for resiliently resisting angular deviation of the handlebars and a line joining the points.

13. The fork assembly according to claim 12, wherein the yaw-resisting means further comprises flat tine portions of the forks, each one of the tine portions including a length of resilient material.

14. The fork assembly according to claim 12, further comprising compression-resisting means to resiliently resist longitudinal compression of the forks.

15. The fork assembly according to claim 14, wherein the compression-resisting means includes for each one of the forks a coil spring disposed between an upper part of the fork and a lower part of the fork.

16. The fork assembly according to claim 15, wherein each one of the forks includes a respective telescoping slide means for longitudinal alignment of the upper part and the lower part during compression of the one of the forks.

17. A front fork assembly of a trailing bicycle for allowing the trailing bicycle to be coupled to a leading bicycle, the trailing bicycle having handlebars and a headset pivot, the fork assembly adapted to mechanically couple the handlebars through a headset to two points of the leading bicycle, each of the points adjacent a rear wheel axis of the leading bicycle; the fork assembly comprising:

respective pitch-motion bearings for coupling the fork assembly to the points;

two elongate forks each mechanically coupling a respective one of the pitch-motion bearings to the headset;

yaw-resisting means for torsional springing between the headset and the pitch-motion bearings, the yaw-resisting means resiliently resisting angular deviation of the handlebars and a line joining the points;

compression-resisting means to resiliently resist longitudinal compression of the forks;

wherein the compression-resisting means includes for each one of the forks a coil spring disposed between an upper part of the fork and a lower part of the fork;

wherein each one of the forks includes a respective telescoping slide means for longitudinal alignment of the upper part and the lower part during compression of the one of the forks; and wherein the telescoping slide means further comprises a yaw-resisting flat tine portion of the fork slidably disposed within an upper slot of the upper part and a lower slot of the lower part.

* * * * *